2,980,672
PHENOTHIAZINE THIOCARBOXYLATES

Arthur W. Weston, Waukegan, Ill., assignor to Abbott Laboratories, North Chicago, Ill., a corporation of Illinois No Drawing. Filed Jan. 16, 1956, Ser. No. 559,096

4 Claims. (Cl. 260—243)

The present invention relates to a new class of organic compounds and more particularly to the phenothiazine thiocarboxylates of the following structural formula

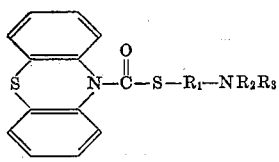

and the salts thereof, wherein $R_1$ is an alkylene group containing from 2 to 4 carbon atoms and —$NR_2R_3$ is a member of the class consisting of dialkylamino and nitrogen containing heterocyclic radicals which are attached to the alkylene group through the nitrogen atom.

The compounds of this invention possess anti-spasmodic properties and antihistaminic properties. The bases represented herein are useful as intermediate in the preparation of the salts also described in the application.

The alkylene group designated above by the symbol $R_1$ includes such radicals as ethylene, propylene, butylene and the branch chain equivalents thereof containing not more than 4 carbon atoms.

The radical —$NR_2R_3$ includes such dialkylamino radicals as may have lower alkyl groups containing up to 4 carbon atoms inclusive, and may also represent such heterocyclic radicals as the piperidinyl, pyrrolidinyl, N-methyl piperazinyl and morpholinyl radicals.

The term "salts" as used herein is intended to include all non-toxic or pharmacologically acceptable salts of the basic compounds, including both the acid addition salts and the quaternary ammonium salts.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide; phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The compounds of this invention are preferably prepared by a reaction between a phenothiazine-10-carboxylic acid halide and an —$NR_2R_3$ alkylmercaptan where —$NR_2R_3$ is as previously defined. The reaction is usually carried out in an inert solvent of the hydrocarbon type such as benzene. The acid addition salts may be suitably prepared directly from the reaction mixture by acidifying with dilute acid such as hydrochloric acid. The alkyl halide quaternary salts are suitably prepared by treating the base in an anhydrous solvent medium with an excess of the alkyl halide and recrystallizing the product from ethanol.

The following examples are given in order to more clearly disclose the nature of the present invention. It should be understood, however, that the examples are not intended to be a limitation on the scope of the invention.

EXAMPLE I

*β-Diethylaminoethyl phenothiazine-10-thiocarboxylate*

A mixture of about 12.3 grams of phenothiazine-10-carboxylic acid chloride and 13.3 grams (0.1 mol) of β-diethylaminoethyl mercaptan are boiled in anhydrous benzene for 24 hours. The reaction mixture is shaken with water and then the benzene layer is extracted with dilute hydrochloric acid. The acid layer is treated with a 40% potassium hydroxide solution and the oil thus formed is extracted with ether. The ethereal solution is dried over magnesium sulfate. A little dry benzene is added and the solvents are removed under reduced pressure. The semi-solid residue is boiled with pentane until all of the soluble material has been dissolved. The hot solution is shaken with charcoal, filtered, concentrated, and cooled in ice. The base, β-diethylaminoethyl phenothiazine-10-thiocarboxylate, crystallizes from said solution. The base may then be recrystallized from petroleum ether if desired.

The hydrochloride salt is prepared by gassing the above base dissolved in ethanol with hydrogen chloride gas and recrystallizing from an ethanol-ether mixture. β-Diethylaminoethyl phenothiazine-10-thiocarboxylate hydrochloride is obtained melting at 187–198° C.

EXAMPLE II

*β-Diethylaminoethyl phenothiazine-10-thiocarboxylate methiodide*

A solution of the base of Example I is dissolved in dry ether and is added to a dry ether solution of methyl iodide in an amount in excess of the stoichiometric amount, and the mixture is allowed to stand for two hours. Crystalline β-diethylaminoethyl phenothiazine-10-thiocarboxylate methiodide is obtained and has a melting point of 230–231° C. with decomposition. The analysis is C, 47.93; H, 4.94; N, 5.70 as compared to the calculated C, 48.0; H, 5.03; N, 5.59.

By a similar process β-diethylaminoethyl phenothiazine-10-thiocarboxylate methobromide is obtained having a melting point of 228° C. with decomposition. The nitrogen analysis is 5.96 as compared to a calculated 6.18.

EXAMPLE III

*β-Dimethylaminoethyl phenothiazine-10-thiocarboxylate*

Proceeding in accordance with the process outlined in Example I, 12.3 grams of phenothiazine-10-carboxylic acid chloride and 10.6 grams (0.1 mol) of β-dimethylaminoethyl mercaptan are reacted and the base, β-dimethylaminoethyl phenothiazine-10-thiocarboxylate, is recovered in solvent solution. The solution is gassed with hydrogen chloride and the crystalline salt, β-dimethylaminoethyl phenothiazine-10-thiocarboxylate hydrochloride, precipitates from solution.

EXAMPLE IV

*β-Diethylaminoisopropyl phenothiazine-10-thiocarboxylate*

Employing the process of Example I, 12.3 grams of phenothiazine-10-carboxylic acid chloride is reacted with 14.7 grams (0.1 mol) of β-diethylaminoisopropyl mercaptan and the resulting base is purified and converted to the hydrochloride by the indicated method. Crystalline β-diethylaminoisopropyl phenothiazine-10-thiocarboxylate hydrochloride is recovered from the reaction mixture.

EXAMPLE V

*β-Diethylaminopropyl phenothiazine-10-thiocarboxylate*

Employing the process of Example I, 26.1 grams (0.1 mol) of phenothiazine-10-carboxylic acid chloride is reacted with 29.4 grams (0.2 mol) of β-diethylaminopropyl mercaptan and the resulting base, β-diethylaminopropyl phenothiazine-10-thiocarboxylate is converted to the hydrobromide salt which crystallizes from solvent medium.

EXAMPLE VI

*β-Pyrrolidylethyl phenothiazine-10-thiocarboxylate*

Employing the process of Example I, 13 grams of phenothiazine-10-carboxylic acid chloride is reacted with 13.1 grams (0.1 mol) of β-pyrrolidylethylmercaptan. The resulting base, β-pyrrolidylethyl phenothiazine-10-thiocarboxylate, is converted to the hdyrochloride salt by the indicated method and the salt is recrystallized from alcoholic solution.

EXAMPLE VII

*β-Piperidylethyl phenothiazine-10-thiocarboxylate*

Employing the process of Example I, 24.5 grams of phenothiazine-10-carboxylic acid chloride is reacted with 36 grams (0.25 mol) of β-piperidylethyl mercaptan and the resulting base, β-piperidylethyl phenothiazine-10-thiocarboxylate, is converted to the hydrochloride salt by the indicated method. The salt precipitates from an alcoholic medium.

EXAMPLE VIII

*β-Dibutylaminoethyl phenothiazine-10-thiocarboxylate*

Employing the process of Example I, 26.1 grams of phenothiazine-10-carboxylic acid chloride is reacted with 18.9 grams (0.1 mol) of β-dibutylaminoethyl mercaptan and the resulting base, β-dibutylaminoethyl phenothiazine-10-thiocarboxylate, is converted to the quaternary ammonium salt thereof by the process of Example II. The resulting salt, β-dibutylaminoethyl phenothiazine-10-thiocarboxylate methiodide, crystallizes from solvent medium.

EXAMPLE IX

*δ-Diethylaminobutyl phenothiazine-10-thiocarboxylate*

Employing the process of Example I, 26.1 grams of phenothiazine-10-carboxylic acid chloride is reacted with 16.1 grams of δ-diethylaminobutyl mercaptan and the resulting base, δ-diethylaminobutyl phenothiazine-10-thiocarboxylate, is converted to the hydrochloride salt by the indicated method.

EXAMPLE X

*β-Morpholinylethyl phenothiazine-10-thiocarboxylate*

Employing the process of Example I, 26.1 grams of phenothiazine-10-carboxylic acid chloride is reacted with 14.7 grams of β-morpholinylethyl mercaptan and the resulting base, β-morpholinylethyl phenothiazine-10-thiocarboxylate, is converted to the hydrochloride salt which crystallizes from solvent medium.

This application is a continuation-in-part of application Serial No. 247,749, now abandoned, filed September 21, 1951.

Others may practice the invention in any of the numerous ways which will be suggested to one skilled in the art upon a reading of this disclosure. All such practice of the invention is intended to be included herewith provided it falls within the scope of the appended claims.

I claim:

1. A compound selected from the group consisting of bases of the formula

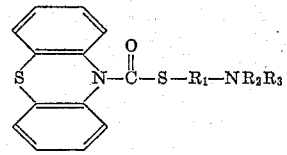

the non-toxic lower alkyl halide quaternary salts and the non-toxic acid addition salts thereof, wherein $R_1$ is an alkylene group containing from 2 to 4 carbon atoms inclusive, and $-NR_2R_3$ is a member selected from the group consisting of diloweralkylamino, piperidyl, pyrrolidyl, N-methylpiperazinyl and morpholinyl groups.

2. β-Diethylaminoethyl pehnothiazine-10-thiocarboxylate.

3. β-Diethylaminoethyl phenothiazine-10-thiocarboxylate hydrochloride.

4. β-Diethylaminoethyl phenothiazine-10-thiocarboxylate methiodide.

References Cited in the file of this patent

UNITED STATES PATENTS 2,650,919     Cusic _____ Sept. 1, 1953

FOREIGN PATENTS 514,330     Belgium _____ Oct. 15, 1952

OTHER REFERENCES

Dahlbom et al.: Acta Pharmacol. et Toxicol., vol. 9, pp. 168–178, (1953).

Dahlbom, Acta Chem. Scand., vol. VII, pp. 879–884 (1953).